United States Patent [19]

Feightner et al.

[11] 4,290,040

[45] Sep. 15, 1981

[54] ELECTROMAGNETIC ACTUATOR HAVING PRELOADED SPRING MEANS

[76] Inventors: L. Clark Feightner, P.O. Box 10, El Dorado Hills, Calif. 95630; E. Dale Hartley, 2700 Jalmia Dr., Los Angeles, Calif. 90046

[21] Appl. No.: 76,344

[22] Filed: Sep. 17, 1979

[51] Int. Cl.³ .............................................. H01F 7/08
[52] U.S. Cl. .................................. 335/274; 335/258; 335/262
[58] Field of Search ...................... 335/274, 258, 262; 417/416, 417

[56] References Cited

U.S. PATENT DOCUMENTS 3,787,791 1/1974 Borger et al. ..................... 335/274
4,152,098 5/1979 Moody et al. ..................... 417/417
4,157,873 6/1979 Ito ..................................... 335/274

Primary Examiner—Harold Broome
Attorney, Agent, or Firm—Gordon L. Peterson

[57] ABSTRACT

An actuator comprising a coil, an armature moveable along a path toward and away from the coil, and a spring for resiliently urging the armature in one direction along the path. The coil is energizable to urge the armature in the other direction along the path against the biasing action of the spring. The spring rate of the spring progressively increases as the armature is moved by electromagnetic forces. This is accomplished by using an appropriately configured leaf spring and a a ramp for progressively supporting the leaf spring as it is deflected. The leaf spring is also preloaded.

10 Claims, 4 Drawing Figures

ELECTROMAGNETIC ACTUATOR HAVING PRELOADED SPRING MEANS

BACKGROUND OF THE INVENTION

One kind of actuator typically includes an armature, a spring for urging the armature in one direction, and electromagnetic means energizable to move the armature against the biasing force of the spring. The electromagnetic means may include a coil and a core. By repeatedly energizing the electromagnetic means, the armature can be driven through many cycles of reciprocation each second. Actuators of this type can be used to power various devices, such as positive displacement pumps.

Actuators of this type must necessarily have a short stroke. One problem with these actuators is in properly limiting the length of the stroke. The obvious way to limit the stroke of the armature as it moves toward the coil is with a positive stop. Unfortunately, however, the rapid and repeated contact of the armature and/or the associated structure against a positive stop produces a noise which makes the actuator unsuited for many applications. Moreover, the positive stops tend to wear and, therefore, permit an increase in the length of the stroke with time. Overstroking as a result of the action of the spring in moving the armature could damage the diaphragm.

SUMMARY OF THE INVENTION

This invention provides a very quiet actuator which does not require the usual positive stops for limiting travel of the armature toward the coil. Overstroking as a result of the spring moving the armature is also substantially eliminated. Moreover, the actuator uses a very short stroke which minimizes inertia problems and facilitates high-speed operation. With a short stroke, the armature can be very close to the core of the coil where the electromagnetic forces are greatest. The actuator is constructed so that tolerances are easily controlled.

To substantially eliminate noise without employing conventional stops, this invention provides for progressively increasing the spring rate of the spring as the armature is moved by the coil. By progressively stiffening the spring in this manner, the spring serves not only to power the return stroke, but also to terminate, or assist in terminating, the stroke provided by the force from the coil. This can be advantageously accomplished by utilizing a leaf spring and one or more ramps for progressively supporting the leaf spring as the leaf spring is deflected under the influence of the electromagnetic force. This reduces the effective length of the leaf spring as the spring is deflected.

To further provide for increasing the spring rate as a function of spring deflection, the leaf spring may have at least one dimension which increases as the leaf spring extends from one end thereof toward a central region of the leaf spring. With this construction, the unsupported length of the leaf spring progressively widens as the leaf spring is deflected to increase the stiffness of the unsupported length of the leaf spring.

In use, the armature is mounted for movement along a path between first and second positions. The spring resiliently urges the armature toward the first position, and the electromagnetic means is energizable to apply a force to the armature to move the armature along the path to the second position against the biasing action of the spring.

Another feature of this invention is to preload the spring in the first position so that the electromagnetic means must provide a force which exceeds the preload on the spring before the spring allows the armature to move along the path toward the second position. With a preloaded spring, the stroke can be relatively short, and the armature can be close to the core at all positions so that the electromagnetic force is relatively high throughout the full stroke. Preloading the spring also tends to avoid overstroking because, upon the return stroke, the spring runs out of powering force for the armature the instant the first or preloaded position is reached. In addition, preloading the spring provides a higher spring force for the return stroke.

This invention uses the armature to provide the preload. This can be accomplished, for example, by providing the armature with a first surface having a configuration different from the configuration of the leaf spring in its relaxed condition and mounting the armature on the leaf spring with the leaf spring being held against the first surface. For example, the first surface may be concave. In this event, the leaf spring is deformed into the concavity of the armature to preload the leaf spring.

The actuator of this invention can be used to power various different devices, such as a pump. When used with a pump, the electromagnetic force and the spring force are used to power the intake and discharge strokes, respectively. With this arrangement, if the pump is shut off, the spring cannot expand against the force of the liquid being pumped. Consequently, the air gap between the armature and the core is minimal, and under these conditions, only a small operating current is required and heat loss is at a minimum. If the spring powers the intake stroke, the air gap would be larger with the pump shut off, and the heat losses would be greater.

The invention can best be understood by reference to the following illustrative description taken in connection with the accompanying illustrative drawings.

DESCRIPTION OF THE PREFERRED EMBODIMENT

Figure 1:
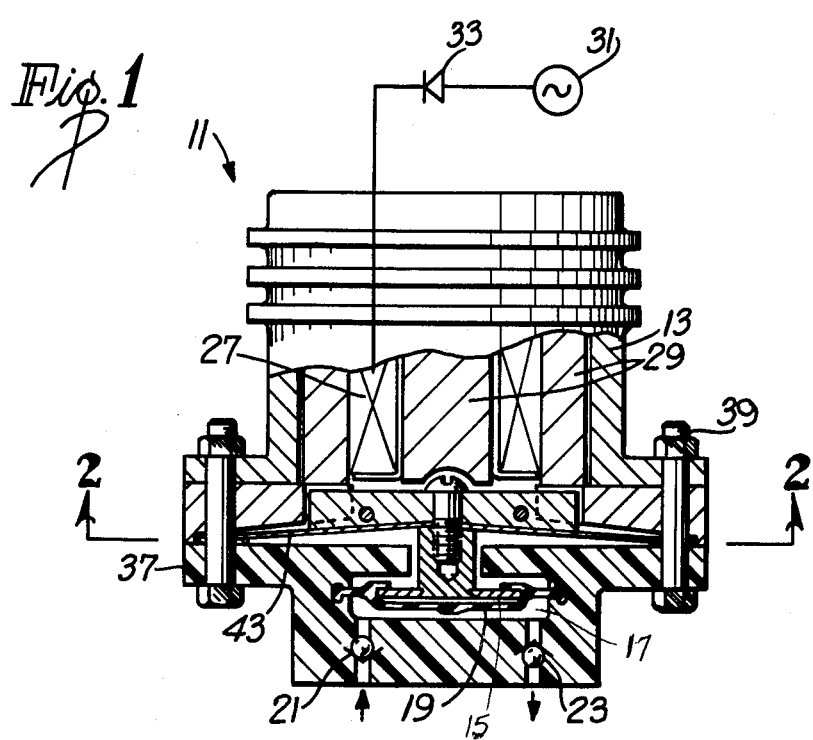
FIG. 1 is an elevational view partially in section of an apparatus constructed in accordance with the teachings of this invention.

FIG. 1 shows an apparatus 11 which generally includes an actuator 13 and a pump 15 driven by the actuator. The actuator 13 may be used to power many different devices, and the pump 15 is merely illustrative. Moreover, the actuator 13 may be used to power many different kinds of positive displacement pumps. In the embodiment illustrated, the pump 15 includes a chamber 17 having a diaphragm 19 reciprocable within the chamber. On the intake stroke, the diaphragm 19 draws in a fluid, such as water, through an inlet check valve 21, and on the discharge stroke, water is forced out of the chamber 17 under pressure through an outlet check valve 23. The diaphragm 19 is suitably coupled to the actuator 13 and is reciprocated thereby.

The actuator 13 includes electromagnetic means which, in the embodiment illustrated, includes a core 25 and a coil 27 wound on the core. The core 25 may be, for example, a conventional E laminated core having three legs 29. The coil 27 can be repeatedly energized by a suitable ac source 31. A diode 33 is coupled in series between the ac source 31 and the coil 27 so that only half of each cycle of ac is applied to the coil. For example, when 60-cycle alternating current is used, the coil 27 is energized sixty times each second.

The core 25 and the coil 27 are suitably mounted within a housing section 35 which forms a heat sink. The housing section 35 closes one end of the apparatus 11 and is releasably coupled to a housing member 37 by threaded fasteners 39. The housing member 37 can be advantageously integrally molded from a plastic material, and the housing section 35 is preferably constructed of metal.

Also mounted on the fasteners 39 and sandwiched between the housing section 35 and the housing member 37 are identical ramps 41 and 41a and a leaf spring 43. The ramps 41 and 41a lie in a groove 42 of the housing member 37, and the ends of the leaf spring are held in a fixed position by the fasteners 39. An armature 45 of magnetic material is mounted on the leaf spring 43 by a screw 47. The core 25 has a cavity 49 to allow the head of the screw 47 to move into close proximity to the core.

The armature 45 in the embodiment illustrated, includes a plurality of plates 51 suitably held together as by a pair of rivets 53. The armature 45 has a concave surface 55 which faces away from the core 25 and which forms a segment of a cylinder.

The threaded end of the screw 47 is received in a coupling 57 which passes through an opening 59 in the housing member 37 and attaches to the diaphragm 19 in any suitable manner. The inner end of the coupling 57 bears against the leaf spring 43 so that the leaf spring is deformed into conformity with the concave surface 55. In the unstressed condition, the leaf spring 43 is planar, and so by deforming the leaf spring as shown in FIG. 1, the leaf spring is preloaded. Accordingly, in order to move the leaf spring 43 toward the core 25 from the position shown in FIG. 1, a force in excess of the preload force on the spring must first be applied to the spring. Also, the preload on the leaf spring 43 enables the armature 45 to be very close to the core 25 in the position of FIG. 1. For example, the stroke of the armature 45 may take it from about 0.050 to 0.060 inch from the core 25 to about 0.005–0.010 inch from the core 25.

Figure 2:
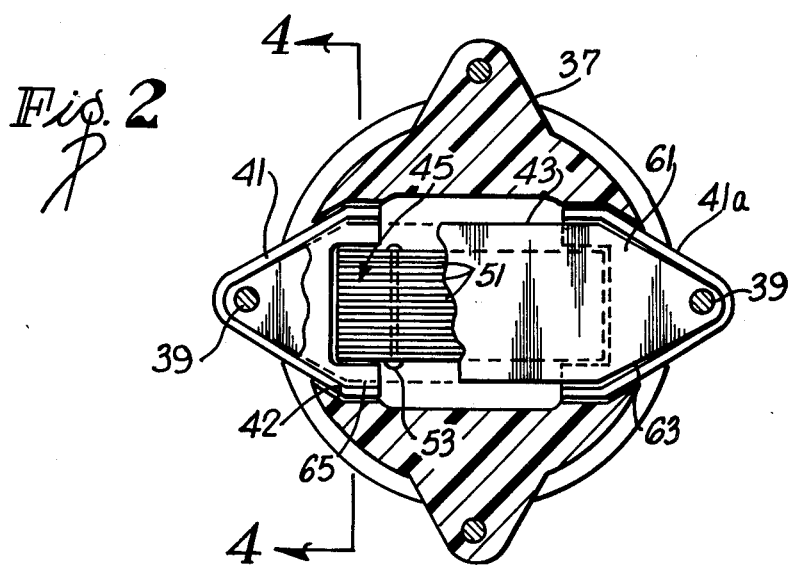
FIG. 2 is a sectional view taken generally along line 2—2 of FIG. 1.
Figure 3:
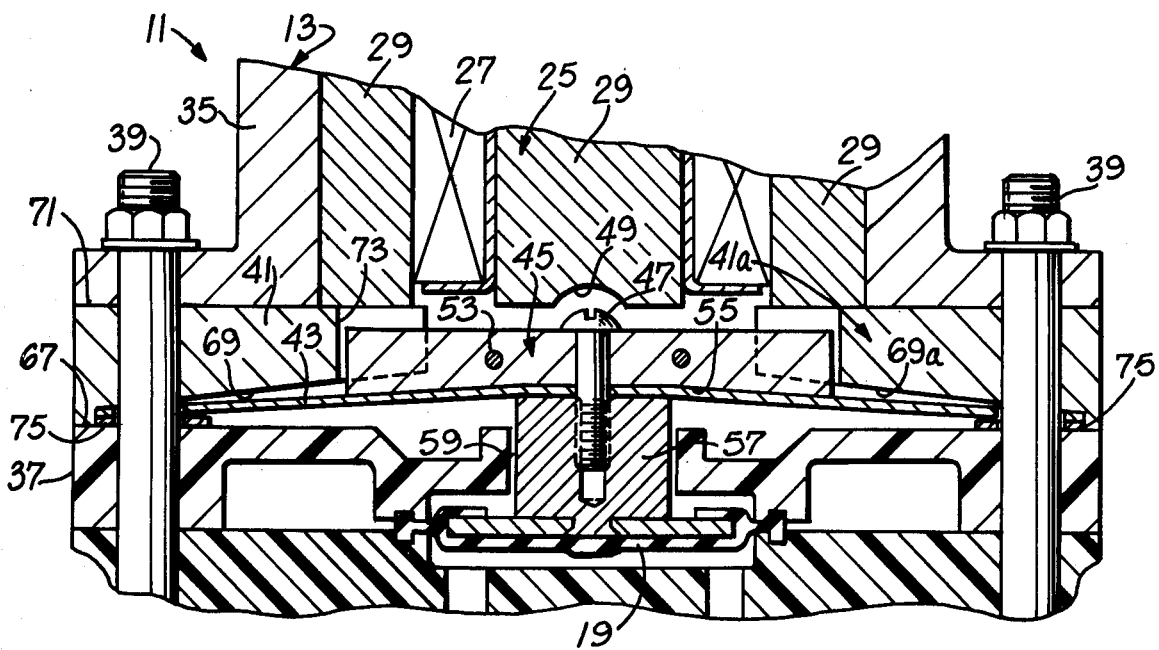
FIG. 3 is an enlarged fragmentary view illustrating a portion of FIG. 1 on an enlarged scale.
Figure 4:
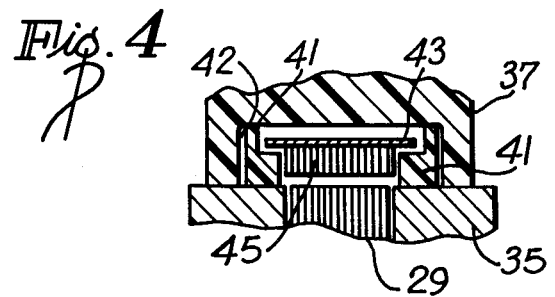
FIG. 4 is a sectional view taken generally along line 4—4 of FIG. 2.

In the embodiment illustrated, the leaf spring 43 is elongated and has openings at its opposite ends through which the threaded fasteners 39 project to firmly mount the leaf spring at its opposite ends to the housing. The leaf spring is resiliently deflectable and so it mounts the armature 45 for movement along a linear path toward and away from the core 25. As shown in FIG. 2, the leaf spring 43 has inclined edges 61 and 63 adjacent its opposite ends so that the leaf spring progressively widens as it extends from its opposite ends toward a central region of the leaf spring. The inclined edges 61 and 63 are joined by parallel edges 65. The leaf spring 43 may be made of any suitable resilient material, such as steel.

The ramps 41 and 41a are provided for progressively supporting the leaf spring 43 as the latter deflects toward the core 25. Portions of the ramp 41a corresponding to portions of the ramp 41 are designated by corresponding reference numerals followed by the letter "a." The ramp 41 may be molded from a plastic material and has an opening through which the fastener 39 projects to securely mount the ramp. The ramp 41 has a ledge 67 which houses one end of the leaf spring 43 and an inclined ramp surface 69 which lies between the leaf spring 43 and the core 25 and which extends toward the core 25 as it progresses inwardly. The ledge 67 rests against the housing member 37 at the bottom of the groove 42 to position the ramp 41 on the housing member 37, and the ramp 41 has an upper surface 71 which abuts the housing section 35. The ramps 41 and 41a are spaced apart to define an opening 73, and the armature 45, in the embodiment illustrated, is received in this opening. As a precaution, stops 75 in the form of rubber washers may be mounted on the fasteners 39 between the leaf spring 43 and the housing member 37 to positively limit travel of the spring 43 in a direction away from the core 25.

With this construction, the leaf spring 43 mounts the armature 45 for movement between a de-energized position shown in FIG. 1 and an energized position in which the armature 45 is pulled closer to the core 25. The electromagnetic force moves the armature 45 to the energized position against the biasing action of the spring 43, and the spring 43 returns the armature to the de-energized position when the coil 27 is de-energized. Thus, the electromagnetic force and the spring power the intake and discharge strokes, respectively, of the diaphragm 19 of the pump 15.

Because the leaf spring 43 is preloaded, energization of the coil 27 does not result in movement of the armature 45 toward the core 25 until the preload force on the spring 43 has been overcome by the electromagnetic force. Thereafter, the armature 45 moves toward the core 25 against the biasing action of the spring 43. However, as the spring 43 deflects to allow such movement of the armature, the ramp surfaces 69 and 69a progressively support increasing lengths of the leaf spring 43. Consequently, the effective length of the leaf spring 43 is progressively shortened as the armature 45 moves toward the core 25. This effective shortening of the leaf spring stiffens it or increases its spring rate.

In addition, as best shown in FIG. 2, the opposite end portions of the leaf spring 43 progressively widen as they extend toward a central region of the leaf spring. Consequently, the effective width of the leaf spring also increases as the armature moves toward the core 25. These two factors combine to materially increase the spring rate of the spring 43.

By the time the leaf spring 43 is deflected against the full length of the ramp surfaces 69 and 69a, the increased spring force has virtually arrested movement of the armature. Additional movement of the spring toward the core 25 is essentially prevented because the central region of the spring is held against deflection by the concave surface 55, and the ramps 41 and 41a retain the end portions of the spring. Thus, the spring brings about termination at a precisely known point of movement of the armature 45 toward the core 25. In this position, the ramp surfaces 69 and 69a form a smooth continuation of the concave surface 55.

When the coil 27 is de-energized, the electromagnetic force is released to allow the spring 43 to power the return stroke of the armature. Because the spring 43 operates above the preload range applied by the concave surface 55 of the armature 45, strong forces are available to power the return stroke. In addition, when the initial position shown in FIG. 1 is reached, the spring force tending to move the armature 45 away from the core 25 instantly terminates so that overstroking is avoided. However, the stops 75 can be provided, if desired, as insurance against any overstroking that may result due to the relatively small inertia of the spring 43 and the armature 45.

Although an exemplary embodiment of the invention has been shown and described, many changes, modifications and substitutions may be made by one having ordinary skill in the art without necessarily departing from the spirit and scope of this invention.

We claim:

1. An apparatus comprising:
   a leaf spring;
   means for mounting the leaf spring at least at two locations with the region of the leaf spring between said two locations being resiliently movable;
   said leaf spring having a predetermined configuration in its relaxed condition;
   an armature having a first surface with a configuration different from said predetermined configuration;
   means for mounting said armature on said region of the leaf spring with the leaf spring being held against the first surface of the armature whereby the first surface of the armature resiliently deflects said region of the leaf spring to preload the leaf spring;
   electromagnetic means energizable to apply a force to the armature to move the armature along a path from a first position to a second position against the biasing force of the leaf spring to increase the load on the leaf spring, said spring moving said armature along said path from said second position toward said first position when the electromagnetic means is de-energized; and
   means for progressively increasing the spring rate of the spring as the armature moves along said path from said first position toward said second position.

2. An apparatus as defined in claim 1 wherein said electromagnetic means includes an "E" core and said armature is laminated with each of at least some of the laminations terminating in an edge surface which forms a portion of said first surface.

3. An apparatus as defined in claim 1 wherein movement of the armature away from said first position in a direction away from said second position is unrestrained by a positive stop.

4. An apparatus as defined in claim 1 wherein said progressively increasing means includes means for progressively reducing the effective length of the leaf spring as it deflects to allow the armature to move toward said second position along said path.

5. An apparatus as defined in claim 4 wherein said means for progressively increasing includes at least one effective cross-sectional dimension of the leaf spring increasing as the leaf spring deflects to allow the armature to move toward said second position along said path.

6. An apparatus as defined in claim 1 wherein said progressively increasing means includes a ramp extending inwardly along the leaf spring from one of said locations to progressively support the leaf spring further toward a central region of the leaf spring as it deflects to allow the armature to move toward said second position along said path.

7. An apparatus as defined in claim 1 including a pump having intake and discharge strokes, said electromagnetic means and said spring powering said intake and discharge strokes, respectively.

8. An apparatus comprising:
   electromagnetic means including a core and a coil wound on the core;
   a housing member;
   attaching means for attaching the electromagnetic means and the housing member;
   a leaf spring;
   means for mounting the leaf spring adjacent the ends of the leaf spring with the leaf spring being resiliently deflectable along a path toward and away from the electromagnetic means;
   an armature mounted on the leaf spring and movable along said path with the leaf spring, said leaf spring resiliently urging the armature in one direction along said path and said electromagnetic means being energizable to urge the armature in the other direction along said path;
   first and second ramp members adjacent the electromagnetic means, each of said ramp members having a ramp surface for progressively supporting greater lengths of the leaf spring as the leaf spring deflects under the influence of said electromagnetic means in said other direction whereby the leaf spring is progressively stiffened;
   said ramp members being spaced apart to define an opening, said armature projecting into said opening;
   said armature having a generally concave surface; and
   means for holding the leaf spring against the concave surface to deflect the leaf spring into the concave surface to preload the leaf spring.

9. An apparatus as defined in claim 8 wherein at least a portion of said leaf spring progressively widens as it extends from one of said ends thereof toward a central region of the leaf spring.

10. An apparatus as defined in claim 8 including a pump having intake and discharge strokes, said electromagnetic means and said spring powering said intake and discharge strokes, respectively.

* * * * *